United States Patent [19]

Balian et al.

[11] Patent Number: 5,387,433
[45] Date of Patent: Feb. 7, 1995

[54] PROTECTIVE LAYER ON A CONDUCTIVE SUBSTRATE

[75] Inventors: Pierre Balian, Paris; Georges Zagdoun, La Garenne-Colombes; Maurice Trouve, Saint Pierre, all of France

[73] Assignee: Saint-Gobain Vitrage International, Courbevoie, France

[21] Appl. No.: 106,779

[22] Filed: Aug. 16, 1993

Related U.S. Application Data

[63] Continuation of Ser. No. 837,936, Feb. 20, 1992, abandoned.

[30] Foreign Application Priority Data

Feb. 20, 1991 [FR] France ................................ 91 02002

[51] Int. Cl.$^6$ ............................................... B05D 1/00
[52] U.S. Cl. ................................. 427/126.3; 427/126.2; 427/126.4; 427/248.1; 427/255.7; 427/294; 427/372.2; 427/376.2
[58] Field of Search ............... 427/126.2, 126.3, 376.2, 427/248.1, 126.4, 372.2, 255.7, 294

[56] References Cited

U.S. PATENT DOCUMENTS

| | | | |
|---|---|---|---|
| 3,885,855 | 5/1975 | Gross | 350/166 |
| 4,252,841 | 2/1981 | Kinnagawa | 427/126.3 |
| 4,377,613 | 3/1983 | Gordon | 428/212 |
| 4,500,383 | 2/1985 | Kashiwagi | 427/126.3 |
| 4,617,206 | 10/1986 | Haisma | 427/126.3 |
| 4,655,811 | 4/1987 | Bitter | 65/60.51 |
| 4,721,632 | 1/1988 | Brown | 427/126.3 |
| 4,960,618 | 10/1990 | Tanitsu | 427/126.3 |
| 5,051,278 | 9/1991 | Paz-Pujalt | 427/126.2 |
| 5,108,479 | 4/1992 | Hirano | 427/126.3 |
| 5,156,884 | 10/1992 | Tanitsu | 427/126.3 |
| 5,185,182 | 2/1993 | Brown | 427/126.3 |
| 5,244,692 | 9/1993 | Zagdoun | 427/126.3 |
| 5,245,392 | 10/1993 | Burns | 427/126.3 |

FOREIGN PATENT DOCUMENTS

| | | |
|---|---|---|
| 0287836 | 8/1988 | European Pat. Off. . |
| 2005224 | 12/1969 | France . |
| 155039 | 9/1984 | Japan ............... 427/376.2 |
| 60-001047 | 5/1985 | Japan . |
| 63-131101 | 6/1988 | Japan . |
| 2136316 | 9/1984 | United Kingdom . |
| 2116590 | 5/1985 | United Kingdom . |

OTHER PUBLICATIONS

Thin Solid Films, vol. 102, No. 1, Apr. 1993, pp. 1–46, K. L. Chopra, et al., "Transparent Conductors—A Status Review".

Chemical Abstracts, vol. 99, No. 14, Oct. 3, 1983, pp. 265, 109648N, & JP-A-58-069743, Apr. 26, 1983.

Journal of Non-Crystalline Solids, vol. 121, No. 1/3, May 1, 1990, pp. 329–333, R. Nass, et al., "Synthesis of an Alumina Coating from Chelated Aluminum Alkoxides".

*Primary Examiner*—Shrive Beck
*Assistant Examiner*—Vi Duong Dang
*Attorney, Agent, or Firm*—Oblon, Spivak, McClelland, Maier & Neustadt

[57] ABSTRACT

The present invention relates to a product containing a glass substrate and a transparent conductive layer made of sub-stoichiometric metallic oxide coated with a metallic oxide overlayer protecting the conductive layer from oxidation. The indices of refraction of the two layers and the geometric thickness of the overlayer may be selected so as to offer a product which has a neutral color under reflection. The invention also concerns processes for obtaining said product.

32 Claims, No Drawings

PROTECTIVE LAYER ON A CONDUCTIVE SUBSTRATE

This application is a continuation of application Ser. No. 07/837,936, filed on Feb. 20, 1992, now abandoned.

BACKGROUND OF THE INVENTION

1. Field of the Invention

The present invention relates to a product containing a glass substrate supporting at least one thin conductive layer of a metallic oxide and possessing low emissivity, low resistivity, and transparency. The present invention further relates to a process for obtaining said product by application of pyrolysis techniques on organometallic compounds, and to applications of this product.

2. Discussion of the Background

A glass substrate supporting at least one thin conductive layer of a metallic oxide and possessing low emissivity, low resistivity, and transparency may be used in many applications. For example, a glass substrate coated with a low emissivity layer can be used to make a window. By increasing the far infrared reflection coefficient on the side of the window facing the inside of the room, it is possible to reduce energy losses through the window resulting from the leakage of radiation from inside the room to the outside. Thus, persons in the room may remain comfortable during the winter at a lower energy cost. Furthermore, the efficiency of an insulating double window may be increased by combining a transparent substrate supporting a low emissivity layer with another transparent substrate and separating the substrates by means of a gas section, and positioning the low emissivity layer on the third surface, counting from the outer surface.

A transparent substrate supporting a low resistivity layer may be used as a windshield or heated rear window in an automobile by providing current feeds. In addition, such a product can be used as a transparent electrode in optoelectronic devices.

The thin layers exhibiting these properties are, for example, layers of indium oxide doped with tin (ITO), zinc oxide doped with aluminum, indium, or fluorine, or tin oxide doped with fluorine. The metallic oxide layers may be deposited on a glass substrate by several different procedures. For example, by vacuum thermal evaporation, by cathodic spraying, by application of a magnetron, and by pyrolysis of organometallic compounds sprayed in liquid, solid, or gaseous form on the surface of the glass substrate and heated to a temperature lower than the melting point of the glass substrate. The organometallic compounds placed in contact with a heated surface decompose while oxidizing and form a metallic oxide layer. Pyrolysis techniques have been developed to such a state that the layer may be deposited on the glass substrate in a line, such as a float line, while the glass is transported at high speeds. While the glass still exists as a continuous strip transported at a given speed and temperature, "precursor" organometallic products are deposited using one or several nozzles as the glass leaves the float bath. Sometimes the glass leaving the float bath reaches speeds of 20 m/minutes.

It is believed the conductivity and low emissivity properties of these layers are attributable, at least partially, from oxygen gaps in the layers. However, if the deposition is effected by pyrolysis, the glass continues on the production line and passes through a reheating drying frame which relaxes the stresses in the glass by controlling the decrease in the glass temperature. When the metallic oxide layer comes into contact with the surrounding air during these operations, it tends to oxidize appreciably. Therefore, it is necessary to effect a reduction annealing operation to maintain the oxygen gaps in the layers. The reduction annealing operation consists of removing the substrate containing layer from the production line and allowing it to remain in a chamber heated to approximately 450° C. under a reducing atmosphere for a determinate period of time. The additional step poses numerous difficulties. It is considered a recovery operation, thereby increasing the cost of production by requiring additional equipment and a reheating of the glass. The reduction annealing operation prohibits thermal treatments such as bending and tempering performed before or after the annealing step. For example, if air-hardening is carried out before the reduction annealing operation, the high temperature required by the reduction annealing operation could destroy, or at least lessen, the effects of the glass-tempering procedure. However, if tempering is performed after the reduction annealing operation, air-hardening which normally requires temperatures of at least 650° C. could reoxidize the layer. Therefore, the discovery of a method for thermally treating a glass substrate supporting at least one thin conductive layer of a metallic oxide without the necessity of performing a reduction annealing operation to preserve the high performance of the layer would be quite useful.

Furthermore, metal oxide layers on a glass substrate, in particular conductive low emissivity layers having interferential thickness, exhibit a color under reflection which is dictated by the thickness selected. For example, an ITO layer exhibits a blue color under reflection when the thickness is 180 nm and a green color under reflection when the thickness is 360 nm. A color is assessed using two parameters. The length of the dominant wave indicates the tone of the color. The purity, expressed as a percentage, indicates the intensity of that tone. If the purity is low, the color is not intense. If the purity is high, the color is very vivid and can be reproduced using monochromatic light.

Because the tone of the color and/or the purity of the color of a substrate under reflection may not be the tone and/or purity desired, or may even be unacceptable for a planned use, especially in the automotive industry where strict aesthetic constraints apply, it is therefore necessary to be able to control the color of a substrate under reflection. For example, by incorporating a layer having a specific composition and thickness, it is possible to obtain a quasi-neutral color under reflection. In addition, slight variations in the thickness of a layer may induce non-aesthetic iridescence.

To reduce interferential coloring under reflection, it has been suggested to deposit at least one intermediate layer on the substrate before depositing the conductive layer. This intermediate layer is chosen so as to possess a predetermined refraction index and geometric thickness, so that the overall color under reflection incorporating these two layers approaches neutrality.

Conventional layers possessing a suitable refraction index include metallic oxide- and metallic nitride-based layers, and mixtures thereof. For example, aluminum oxide may be combined with other oxides such as $SnO_2$, $ZnO$, $TiO_2$, etc., and silicon oxycarbide or oxynitride. The intermediate layer may reduce the coloring under reflection, but may entail manufacturing constraints.

SUMMARY OF THE INVENTION

Accordingly, one object of this invention is to provide a glass substrate coated with a metallic oxide layer having low resistivity and low emissivity properties, without having to carry out a treatment, such as a reduction annealing operation, to improve low resistivity and low emissivity properties.

A further object of this invention is to produce a glass substrate coated with a metallic oxide layer having low resistivity and low emissivity properties and permitting subsequent thermal treatments such as bending and/or tempering, without harming the properties of said layer-incorporating substrate and without requiring special precautions, such as treatment under a reducing atmosphere.

A further object of this invention is to control the coloring under reflection of a glass substrate coated with a metallic oxide layer having low resistivity and low emissivity properties.

A further object of the invention is to produce a glass substrate coated with a metallic oxide layer having low resistivity and low emissivity properties and quasi-neutrality under reflection.

A further object of this invention is to provide a glass substrate incorporating at least one layer having interferential thickness without the appearance of defects due to iridescence.

The product according to the invention comprises a glass substrate, a transparent conductive layer made of a sub-stoichiometric metallic oxide, and a metallic oxide overlayer which protects the conductive layer from oxidation. The product may be manufactured by depositing a metallic oxide overlayer on a conductive layer coated glass substrate.

DETAILED DESCRIPTION OF THE PREFERRED EMBODIMENTS

The conductive layer made of a sub-stoichiometric metallic oxide possesses properties corresponding to those obtained following a reducing annealing operation. The conductive layer is advantageously formed by a doped metallic oxide, such as indium oxide doped with tin (ITO), tin oxide doped with fluorine ($SnO_2$:F), zinc oxide doped with indium (ZnO:In), zinc oxide doped with fluorine (ZnO:F), zinc oxide doped with aluminum (ZnO:Al), zinc oxide doped with tin (ZnO:Sn), or mixtures thereof. The overlayer may contain aluminum oxide ($Al_2O_3$), titanium oxide ($TiO_2$), zinc oxide (ZnO), zirconium oxide ($ZrO_2$), chrome oxide ($Cr_2O_3$), silica ($SiO_2$), or mixtures thereof. Preferably, the overlayer contains aluminum oxide.

The product preferably comprises a glass substrate and two metallic oxide layers and possesses an emissivity which is less than or equal to 0.2. The overlayer protects the conductive layer thereby preserving a state of oxygen sub-stoichiometry in the conductive layer. This sub-stoichiometry is important because it intensifies the desired electronic properties of the conductive layer. By applying an overlayer to protect the oxygen sub-stoichiometry in the conductive layer, it becomes possible to avoid the necessity of performing a reduction annealing operation on the conductive layer because its oxygen sub-stoichiometry is no longer threatened by subsequent reoxidation.

The substrate coated with a conductive layer and an overlayer can undergo any thermal treatment necessary for bending and/or tempering purposes without damaging the properties of the conductive layer. This is particularly advantageous in the case of a conductive layer made of ITO or doped ZnO which normally must be subjected to a reducing annealing operation. As a result, it becomes possible to foresee more diverse applications of these layers.

To control the coloration under reflection of this product and thereby obtain a window which is neutral under reflection, a suitable choice of refraction indices for the two layers must be made in accordance with the invention. The optical thickness of the overlayer which is defined as the product of the true thickness and the refraction index of the layer under consideration must be determined. By choosing an overlayer whose refraction index is less than that of the conductive layer, an "index gradient" is created between the index of the conductive layer, generally ranging between 1.8 and 2, the index of the overlayer, advantageously chosen between 1.4 and 1.7, and the index of the ambient air, which is 1. If an optical thickness value of the overlayer corresponding to approximately one-quarter of the wavelength of incident light averaged over the visible spectrum and centered on 510 nm is chosen, a product having a quasi-neutral color under reflection results and can be quantified by a purity under reflection of less than or equal to 10%. The direct consequence of obtaining a product which has a quasi-neutral color under reflection is that the likelihood of the presence of iridescence is decreased. Neutral color under reflection is advantageously achieved using a conductive layer possessing interferential thickness chosen from among those previously mentioned, such as ZnO:In, ZnO:Al, ZnO:Sn, $SnO_2$:F, whose refraction indices range between approximately 1.8 and 2. The refraction index of the overlayer may be controlled by selecting a metallic oxide alone whose refraction index ranges between 1.4 and 1.7 (i.e., aluminum oxide), or a suitable mixture of metallic oxides. For example, a desired refraction index may be obtained by mixing a metallic oxide having an index greater than 2, such as $ZrO_2$, with another oxide having a lower index, such as $Al_2O_3$ or $SiO_2$. The capacity to produce a reflection-neutral product is very advantageous because it becomes possible to foresee the expanded range of uses this product may have in such industries as the building, automotive, and electronics industries.

The glass substrate may be selected based upon its desired use. For example, a silico-sodo-calcic substrate may be clear or colored in batches. Glass termed "clear" may exhibit a high level of luminous transmission ($T_L$) of approximately 90% for a thickness of 4 mm. Glass colored in batches may be made of the glass called "TSA" which contains $Fe_2O_3$ in a proportion by weight of between approximately 0.55 to 0.62% and FeO in a proportion by weight of between 0.11 to 0.16% providing an $Fe^{2+}/Fe^{3+}$ ratio of approximately 0.19 to 0.25, and CoO in a proportion of less than 12 ppm, and preferably less than 10 ppm. More highly colored glass made of "TSA++" contains $Fe_2O_3$ in a proportion by weight of between approximately 0.75 and 0.9% and FeO in a proportion by weight of between 0.15% and 0.22% providing an $Fe^{2+}/Fe^{3+}$ ratio of 0.2, and CoO in a proportion of less than 17 ppm, and preferably less than 10 ppm. The result is lower $T_L$ values of approximately 78% for a thickness of 3.85 mm for "TSA" glass, and of approximately 72% for "TSA++" glass of the same thickness.

Whether greater importance is attributed solely to the objective of a product which no longer requires a reducing treatment subsequent to deposition of the conductive layer and/or a product which can be subjected to a bending/tempering-type thermal treatment, or whether one wishes to achieve the additional objective of a window having a neutral color under reflection, any conventional procedure can be implemented for deposition of these layers. As previously indicated, vacuum techniques can be chosen to deposit both layers or only one of them.

Pyrolysis techniques advantageously allow depositions to be made on the glass production line. Pyrolysis may be employed to deposit both layers or only one layer. It is necessary to protect the conductive layer by means of the overlayer when the electronic properties of the conductive layer have reached their optimal state. This state is recognized when the metallic oxide is doped and in a condition of oxygen sub-stoichiometry. For example, a conductive layer of ITO that has just been deposited by pyrolysis on a glass substrate leaving a flotation bath is sub-stoichiometric. Its electronic properties will be altered subsequent to this thermal process if the glass is allowed to cool to ambient temperature under an oxygen containing atmosphere, thereby requiring the implementation of a reduction annealing operation. Blocking the oxidation process by deposition of an overlayer makes it possible to obtain a substrate incorporating a conductive layer having high performance levels and capable of undergoing any thermal treatment, such as tempering, while potentially eliminating the need for a reducing treatment.

The deposition of the conductive layer and that of the protective overlayer are preferably carried out under conditions not requiring a reduction annealing operation. They may also be separated over time when the conductive layer is produced under conditions not requiring the implementation of a reducing annealing operation. This situation may result from the nature of the conductive layer or from the method of its production. For example, in the case of an ITO layer which might be produced by deposition in a vacuum and would not undergo the oxidation observed in pyrolysis techniques on a float line.

Preferably, two layers are obtained by effecting two depositions by means of pyrolysis. These deposits are advantageously consecutive, thus minimizing the time during which the conductive layer is in contact with the atmosphere. To the extent that the properties of the ITO layer have deteriorated before coating, these properties are regenerated before deposition of the overlayer by means of a suitable treatment. In the event the deposit of both the conductive layer and the overlayer is effected by pyrolysis, the following is a disclosure of useful "precursor" organometallic compounds which, when pyrolyzed, yield the desired metallic oxides. However, it should be kept in mind that another production process can be used, in particular any process utilizing a vacuum. Accordingly, to obtain an ITO conductive layer by pyrolysis, a pulverulent mixture of indium formate and dibutyltin oxide is preferably chosen. If the conductive layer is made of $SnO_2$:F, it may be obtained by powder pyrolysis using powdered dibutyltin oxide (DBTO) and gaseous, anhydrous fluorhydric acid, as described in Patent FR-2 380 997, and potentially using dibutyltin difluoride (DBTF) mixed with DBTO, as described in Patents EP-A-178 956 and EP-A-039 256. It may also be obtained by pyrolysis in the gaseous phase, in particular using a mixture of tin compounds such as $(CH_3)_2 SnCl_2$, $(C_4H_9)_2 SnCl_2$, $Sn(C_2H_5)_4$, and of organofluoride compounds such as $CCl_2F_2$, $CHClF_2$ and $CH_3CHF_2$, as described in Patent EP-A-027 403, or using monobutyltrichlorotin and a compound corresponding to formula X $CHF_2$, such as chlorodifluoromethane, mentioned in Patent EP-A-121 459. It may also be obtained by pyrolysis in the liquid phase using tin acetylacetonate or dimethyltin-2-propionate in suitable organic solvents, such as those described, in particular, in Patent FR-2 211 411.

Layers of ZnO:In or ZnO:Al may be obtained by pyrolysis in the vapor phase, using diethylzinc or zinc acetate and triethylindium, indium chloride or triethylaluminum, or aluminum chloride, as described in Patent Application EP-A-385 769.

To produce an aluminum oxide ($Al_2O_3$)-based overlayer, an organic aluminum compound having at least one alcoholate function or at least one β-diketone function can be pyrolyzed. Such an organic compound may be based on one of the following products: aluminum tri-isopropylate, aluminum tri-n-butyrate, aluminum tri-ter butylate, aluminum tri-ethylate, and aluminum acetylacetonate.

To form the layers according to the invention on the glass substrate, in particular by pyrolysis of powder, various conventional devices may be used, such as those described in European Patent Applications EP-A-6 064, 125 153, 130 919, 188 962, 189 709, 191 258, and 329 519. In general, to deposit a layer, use is made of a supply nozzle positioned above the heated glass substrate to be treated, in particular a glass strip in motion such as float glass, either in the float bath itself or downstream from this bath. In the case of powder pyrolysis, a nozzle extending transversely over the entire width of the glass strip is conventionally used. Said nozzle is fitted with a cavity fed uniformly with powder in a gas suspension. The powder is sprayed through the slit in the nozzle and becomes pyrolyzed on the heated glass surface. In the case of pyrolysis of precursors in liquid suspension, the nozzle design is different. The nozzle is movable and describes a transverse back-and-forth path in relation to the glass strip. In the gaseous phase, also termed Chemical Vapor Deposition, or CVD, suitable nozzles are described in French Patent 2 274 572.

The glass strip leaving the float bath is transported at a speed normally ranging between 3 and 25 m/minutes. Depositions by pyrolysis are effected at temperatures of between 400° and 750° C., between 400° and 610° C. outside of the float bath and over 610° C. inside the float bath. In the event the depositions of layers are performed consecutively using two pyrolysis steps, whether in the solid, liquid, or gaseous phase, it is usually advantageous to position the two nozzles in proximity to each other. This arrangement reduces the possibility that the conductive layer may oxidize before deposition of the overlayer. If the precursors of the two layers are selected so that they have pyrolysis points corresponding to those encountered on the float production line and, furthermore, are very close together when the two depositions are made consecutively, a glass-reheating operation between the two deposition operations is eliminated. However, care must be taken to ensure that an excessively marked proximity between the two nozzles does not cause an over-pronounced interpenetration of the two streams. Such a phenomenon could damage the homogeneity of the layers and harm the interface between the layers.

Other features of the invention will become apparent in the course of the following descriptions of exemplary embodiments which are given for illustration of the invention and are not intended to be limiting thereof.

EXAMPLES 1 AND 2

The deposition of a conductive ITO layer was effected by pyrolysis of a powder composed of 90% by weight of indium formate $IN(CHO)_3$ and 10% by weight of dibutyltin oxide (DBTO) on clear float glass 4 mm thick transported opposite the nozzle at a speed of 7 m/minutes and at a temperature of 625° C. The supporting gas was air.

EXAMPLE 1

Thickness of ITO layer=360 nm

A reduction annealing operation was performed on the substrate and ITO layer by resting the substrate and ITO layer for 30 minutes at 420° C. in an atmosphere containing nitrogen and hydrogen in a ratio of 90/10.

Characteristics obtained: (where $T_L$ is light transmittance and $R_L$ is luminous reflection and both were measured using illuminant $D_{65}$, $\gamma domR$ is length of the dominant wavelength of the color under reflection and indicates the tone of the color, P is the purity of the color under reflection and indicates the intensity of the tone, $\epsilon$ is the emissivity, $\rho$ is the resistivity, and R is the resistance)

$T_L = 78.9\%$
$R_L = 14\%$
$\lambda domR = 506$ nm  } green color under reflection
$P = 11.12\%$
$\epsilon = 0.08$
$\rho = 2 \cdot 10^{-4} \, \Omega \cdot cm$

EXAMPLE 2

The substrate incorporating an ITO layer and having undergone the reduction annealing operation according to Example 1, was subsequently reheated in an oven to 650° C.

Characteristics obtained:
$\epsilon 0.45$
$R > 50 \, \Omega$

It was found that a glass substrate containing an ITO layer thereon without a protective overlayer possesses relatively pronounced coloring under reflection and a purity greater than 10%. To obtain a satisfactory emissivity value, i.e., a value less than 0.2, a reduction annealing operation is required. Thus, the low emissivity and low resistivity properties are completely destroyed if the unit is reheated so as to simulate a thermal treatment such as bending and/or air-tempering.

EXAMPLES 3 TO 6

A conductive layer and an overlayer according to the invention were deposited by two consecutive powder pyrolysis operations under the same conditions. The glass substrate was identical to that used in Example 1. The ITO conductive layer was obtained according to the manner described in Example 1. The overlayer was made of aluminum oxide $Al_2O_3$ and obtained by pyrolysis of aluminum tri-isopropylate (IPA). No reheating step was performed between the two depositions.

EXAMPLE 3

Thickness of $Al_2O_3$ layer=100 nm

Thickness of ITO layer=200 nm
Characteristics obtained:

$T_L = 87.2\%$
$R_L = 8.7\%$
$\lambda domR = 524$ nm  } neutral color under reflection
$P = 5.2\%$
$\epsilon = 0.10$
$\rho = 2 \cdot 10^{-4} \, \Omega \cdot cm$ Without performing a reduction annealing operation, low emissivity and low resistivity properties absolutely comparable to those in Example 1 were obtained for a thinner ITO layer. Furthermore, from an optical standpoint, performance is greatly improved because the light transmittance is increased considerably. Luminous reflection and the purity of the color under reflection simultaneously diminish appreciably, thereby providing a neutral color under reflection.

EXAMPLE 4

The two layers deposited on the substrate in accordance with Example 3 were subsequently reheated for 6 minutes in an oven at 650° C.

Characteristics obtained:
$\epsilon = 0.11$.

This clearly demonstrates that the overlayer according to the invention makes it possible to effectively protect the conductive layer and to preserve its properties, in particular low emissivity, during a subsequent thermal treatment.

EXAMPLE 5

Thickness of ITO layer=310 nm
Thickness of $Al_2O_3$ layer=70 nm

The substrate incorporating these two layers was then reheated for 6 minutes in an oven at 650° C.
Characteristics obtained:

$T_L = 86.9\%$
$R_L = 10.5\%$
$\lambda domR = 504$ nm  } neutral color under reflection
$P = 4.7\%$
$\epsilon = 0.10$
$\rho = 7 \, \Omega \cdot cm.$ Here again, even after reheating, satisfactory electronic and optical performance was achieved, since the layer-incorporating substrate possessed a neutral color under reflection with a purity of less than 5%.

EXAMPLE 6

A procedure similar to Example 5 was performed except that the thicknesses of the layers was changed.
Thickness of ITO layer=280 nm
Thickness of $Al_2O_3$ layer=90 nm
Characteristics obtained:

$T_L = 86.8\%$
$R_L = 8.8\%$
$\lambda domR = 525$ nm  } neutral color under reflection
$P = 6.6\%$
$\epsilon = 0.10$
$\rho = 7 \, \Omega \cdot cm.$

EXAMPLES 7 AND 8

The conductive layer was made of tin oxide doped with fluorine ($SnO_2$:F) and obtained by means of pyrolysis of powder using DBTF on a substrate having the same characteristics as those previously mentioned, and under the same speed and temperature conditions.

EXAMPLE 7

There was no deposition of an overlayer.
Thickness of $SnO_2$:F layer=360 nm
Characteristics obtained:

$T_L = 76.4\%$
$R_L = 14.3\%$
$\lambda domR = 537$ nm  } pronounced coloration under reflection
$P = 13.5\%$
$\epsilon = 0.22$.

In the absence of an overlayer, it was thus found that the substrate incorporating a layer of $SnO_2$:F was very highly colored under reflection, a situation which may prove harmful with respect to its intended application.

EXAMPLE 8

A substrate having a layer of $SnO_2$:F according to Example 7 was covered with an overlayer of $Al_2O_3$ according to the invention by means of powder pyrolysis of IPA.
Thickness of $SnO_2$:F layer=360 nm
Thickness of $Al_2O_3$ layer=80 nm
Characteristics obtained:

$T_L = 83.4\%$
$R_L = 7.6\%$
$\lambda domR = 563$ nm  } pronounced coloration under reflection
$P = 2.6\%$
$\epsilon = 0.23$.

It was discovered that the addition of an $Al_2O_3$ overlayer increased the light transmittance, reduced the luminous reflection, and reduced the purity under reflection considerably. The dominant wavelength was conventionally negative in accordance with the chromatic diagram, thereby signifying that the tone would fall in the purple range. The purity was so low that the coloration was "washed with white" to a pronounced degree providing a neutral color under reflection of exceptional quality.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for manufacturing a product comprising a glass substrate, a transparent conductive layer of an oxygen substoichiometric metallic oxide on said glass substrate and a metallic oxide overlayer which protects the conductive layer from oxidation on said oxygen substoichiometric metallic oxide, comprising:
    a) depositing said conductive layer in its oxygen substoichiometric state on said glass substrate, and
    b) depositing said metallic oxide overlayer on said conductive layer while the metallic oxide of said conductive layer is in its oxygen substoichiometric state,
    said step b) not involving any reducing step of said conductive layer,
    thereby preserving the oxygen substoichiometry of the conductive layer.

2. The process according to claim 1, further comprising subsequently heat-treating said product without oxidizing its conductive layer.

3. The process according to claim 2, wherein the heat-treating comprises an annealing, bending or tempering step, or a combination of these steps.

4. The process according to claim 1, wherein the conductive layer comprises at least one doped metallic oxide selected from the group consisting of indium oxide doped with tin (ITO), zinc oxide doped with indium (ZnO:In), zinc oxide doped with fluorine (ZnO:F), zinc oxide doped with aluminum (ZnO:Al), and zinc oxide doped with tin (ZnO:Sn).

5. The process according to claim 1, wherein the overlayer comprises at least one metallic oxide selected from the group consisting of aluminum oxide ($Al_2O_3$), titanium oxide ($TiO_2$), silica ($SiO_2$), zinc oxide (ZnO), zirconium oxide ($ZrO_2$) and chromium oxide ($Cr_2O_3$).

6. The process according to claim 1, wherein the overlayer is an aluminum oxide-based overlayer.

7. The process according to claim 1, wherein the conductive layer is obtained using a pyrolysis technique.

8. The process according to claim 1, wherein the overlayer is obtained by using a pyrolysis technique.

9. The process according to claim 1, wherein the product possesses an emissivity less than or equal to 0.2.

10. The process according to claim 1, wherein the refraction index of the transparent conductive layer is between 1.8 and 2, and the refraction index of the overlayer is between 1.4 and 1.7.

11. The process according to claim 1, wherein the refraction indices and optical thicknesses of the layers are selected in such a way that the product possesses a purity under reflection which is less than or equal to 10%.

12. The process according to claim 1, wherein the refraction indices and optical thicknesses of the layers are selected in such a way that the product possesses a purity under reflection which is less than or equal to 6%.

13. The process according to claim 1, wherein the thickness of the overlayer ranges between 50 and 120 nm.

14. The process according to claim 1, wherein the thickness of the overlayer ranges between 80 and 100 nm.

15. The process according to claim 1, wherein said conductive layer is coated with a metallic oxide overlayer having a refraction index less than that of the conductive layer and having an optical thickness approximately equal to one-quarter of the wavelength of the incident light averaged over the visible spectrum and centered on 510 nm, so that the product has a neutral color under reflection.

16. The process according to claim 14, wherein the transparent conductive layer comprises at least one doped metallic oxide selected from the group consisting of indium oxide doped with tin (ITO), tin oxide doped with fluorine ($SnO_2$:F) and zinc oxide doped with indium (ZnO:In), zinc oxide doped with fluorine (ZnO:F), zinc oxide doped with aluminum (ZnO:Al) and zinc oxide doped with tin (ZnO:Sn).

17. The process according to claim 14, wherein the overlayer comprises at least one metallic oxide selected from the group consisting of aluminum oxide ($Al_2O_3$), titanium oxide ($TiO_2$) zinc oxide (ZnO), zirconium oxide ($ZrO_2$) and chromium oxide ($Cr_2O_3$).

18. The process according to claim 14, wherein the overlayer comprises chromium oxide ($Cr_2O_3$) and silica ($SiO_2$).

19. The process according to claim 14, wherein the overlayer is an aluminum oxide-based overlayer.

20. The process according to claim 14, wherein the conductive layer is obtained using a pyrolysis technique.

21. The process according to claim 14, wherein the overlayer is obtained by using a pyrolysis technique.

22. The process according to claim 14, wherein said product possesses an emissivity less than or equal to 0.2.

23. The process according to claim 14, wherein said product is subjected to a bending/tempering thermal cycle subsequent to deposition of the overlayer.

24. The process according to claim 14, wherein the refraction index of the transparent conductive layer is between 1.8 and 2, and the refraction index of the overlayer is between 1.4 and 1.7.

25. The process according to claim 14, wherein the refraction indices and optical thicknesses of the layers are selected in such a way that the product possesses a purity under reflection which is less than or equal to 10%.

26. The process according to claim 14, wherein the refraction indices and optical thicknesses of the layers are selected in such a way that the product possesses a purity under reflection which is less than or equal to 6%.

27. The process according to claim 14, wherein the thickness of the overlayer ranges between 50 and 120 nm.

28. The process according to claim 2, further comprising depositing the conductive layer and the overlayer on the glass substrate by two pyrolysis operations carried out with organometallic compounds.

29. The process according to claim 14, wherein the aluminum oxide overlayer is deposited by pyrolysis of an organic aluminum compound possessing at least one alcoholate or $\beta$-diketone function.

30. The process according to claim 28, wherein the organic aluminum compound is selected from the group consisting of aluminum tri-isopropylate, aluminum tri-n-butylate, aluminum tri-t-butylate, aluminum tri-ethylate and aluminum acetylacetonate.

31. The process according to claim 14, wherein the depositions of the layers by means of pyrolysis occur consecutively.

32. The process according to claim 2, wherein at least one of the layers is deposited by means of a vacuum process.

* * * * *